(12) United States Patent
Walters et al.

(10) Patent No.: US 11,842,237 B2
(45) Date of Patent: Dec. 12, 2023

(54) BIODEGRADABLE CARDS AND SYSTEMS AND METHODS FOR MAKING THE SAME

(71) Applicant: Capital One Services, LLC, McLean, VA (US)

(72) Inventors: Austin Walters, Savoy, IL (US);
Vincent Pham, Champaign, IL (US);
Jeremy Goodsitt, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 20 days.

(21) Appl. No.: 16/915,065

(22) Filed: Jun. 29, 2020

(65) Prior Publication Data
US 2021/0406627 A1     Dec. 30, 2021

(51) Int. Cl.
| | |
|---|---|
| *G06K 19/06* | (2006.01) |
| *B41M 5/00* | (2006.01) |
| *B05D 1/02* | (2006.01) |
| *B05D 7/06* | (2006.01) |

(52) U.S. Cl.
CPC ......... *G06K 19/06196* (2013.01); *B05D 1/02* (2013.01); *B05D 7/06* (2013.01); *B41M 5/0076* (2013.01)

(58) Field of Classification Search
CPC ............. G06K 19/06196; G06K 7/084; G06K 1/125; G06K 19/06206; H01F 41/16; H01F 27/366; H01F 1/06; B05D 1/02; B05D 7/06; B05D 3/207; B05D 5/06; B05D 2203/20; B41M 5/0076; B41M 3/14
See application file for complete search history.

(56) References Cited

U.S. PATENT DOCUMENTS

| | | | |
|---|---|---|---|
| 4,262,058 A | 4/1981 | Saunders | |
| 4,710,617 A | 12/1987 | Mouchotte | |
| 5,366,251 A | 11/1994 | Brandt et al. | |
| 5,661,099 A | 8/1997 | Mitchell, Jr. | |
| 6,326,071 B1 | 12/2001 | Francoeur | |
| 6,509,075 B1 | 1/2003 | McCurry et al. | |
| 6,737,137 B2 | 5/2004 | Franko, Sr. et al. | |
| 7,846,501 B2 | 12/2010 | Benson | |
| 8,449,963 B1 | 5/2013 | Valenti, Jr. et al. | |

(Continued)

FOREIGN PATENT DOCUMENTS

| | | | |
|---|---|---|---|
| JP | 2005007695 A | * | 1/2005 |
| JP | 2014044643 A | * | 3/2014 |
| WO | 96 23276 A1 | | 8/1996 |

OTHER PUBLICATIONS

Encyclopedia.com, Corrosion and Material Degradation, 2019.*

(Continued)

*Primary Examiner* — Thien T Mai
(74) *Attorney, Agent, or Firm* — HUNTON ANDREWS KURTH LLP

(57) ABSTRACT

Example embodiments of biodegradable cards and systems and methods making the same are provided. A biodegradable card can comprise a biodegradable substrate, a magnetic particle slot within the biodegradable substrate configured to receive magnetic particles, a high coercivity magnetic stripe comprising magnetic particles printed on the biodegradable substrate and encoded with payment account data, and a biodegradable water resistant coating, wherein the coating covers at least the magnetic stripe.

20 Claims, 8 Drawing Sheets

(56) References Cited

U.S. PATENT DOCUMENTS

| | | |
|---|---|---|
| 9,199,427 B2 | 12/2015 | Weidauer et al. |
| 2002/0096569 A1* | 7/2002 | Boutaghou ...... G06K 19/06196 235/493 |
| 2002/0100194 A1 | 8/2002 | Huffer et al. |
| 2003/0025321 A1* | 2/2003 | Lee .................. G07D 7/04 283/82 |
| 2004/0076803 A1 | 4/2004 | Jaynes |
| 2004/0244907 A1 | 12/2004 | Huffer et al. |
| 2006/0188699 A1 | 8/2006 | Kreuter |
| 2007/0059500 A1 | 3/2007 | Benson |
| 2007/0241201 A1* | 10/2007 | Brown .................. G06Q 20/26 235/493 |
| 2007/0281141 A1 | 12/2007 | Kohlweyer |
| 2009/0324981 A1 | 12/2009 | Starkey |
| 2011/0081552 A1 | 4/2011 | Williams |
| 2011/0262723 A1 | 10/2011 | Lavosky |
| 2011/0285122 A1 | 11/2011 | Hill et al. |
| 2012/0037304 A1 | 2/2012 | Saint et al. |
| 2012/0231189 A1 | 9/2012 | Zilber |
| 2012/0231190 A1 | 9/2012 | Zilber |
| 2016/0018748 A1 | 1/2016 | Koger et al. |
| 2017/0061269 A1* | 3/2017 | Andelin ........... G06K 19/06196 |
| 2017/0109622 A1* | 4/2017 | Cepress .......... G06K 19/07737 |
| 2017/0253021 A1 | 9/2017 | Antoniuk et al. |
| 2020/0193250 A1* | 6/2020 | Ormiston ............. B42D 25/373 |

OTHER PUBLICATIONS

Tiwari et al., "A Review: Student Smart Card" (Year: 2019).*
International Search Report and the Written Opinion of the International Searching Authority issued in related PCT Application No. PCT/US2021/037880, dated Dec. 3, 2021.
Notification Concerning Transmittal of International Preliminary Report on Patentability from related PCT Application No. PCT/US2021/037880, dated Jan. 12, 2023.

* cited by examiner

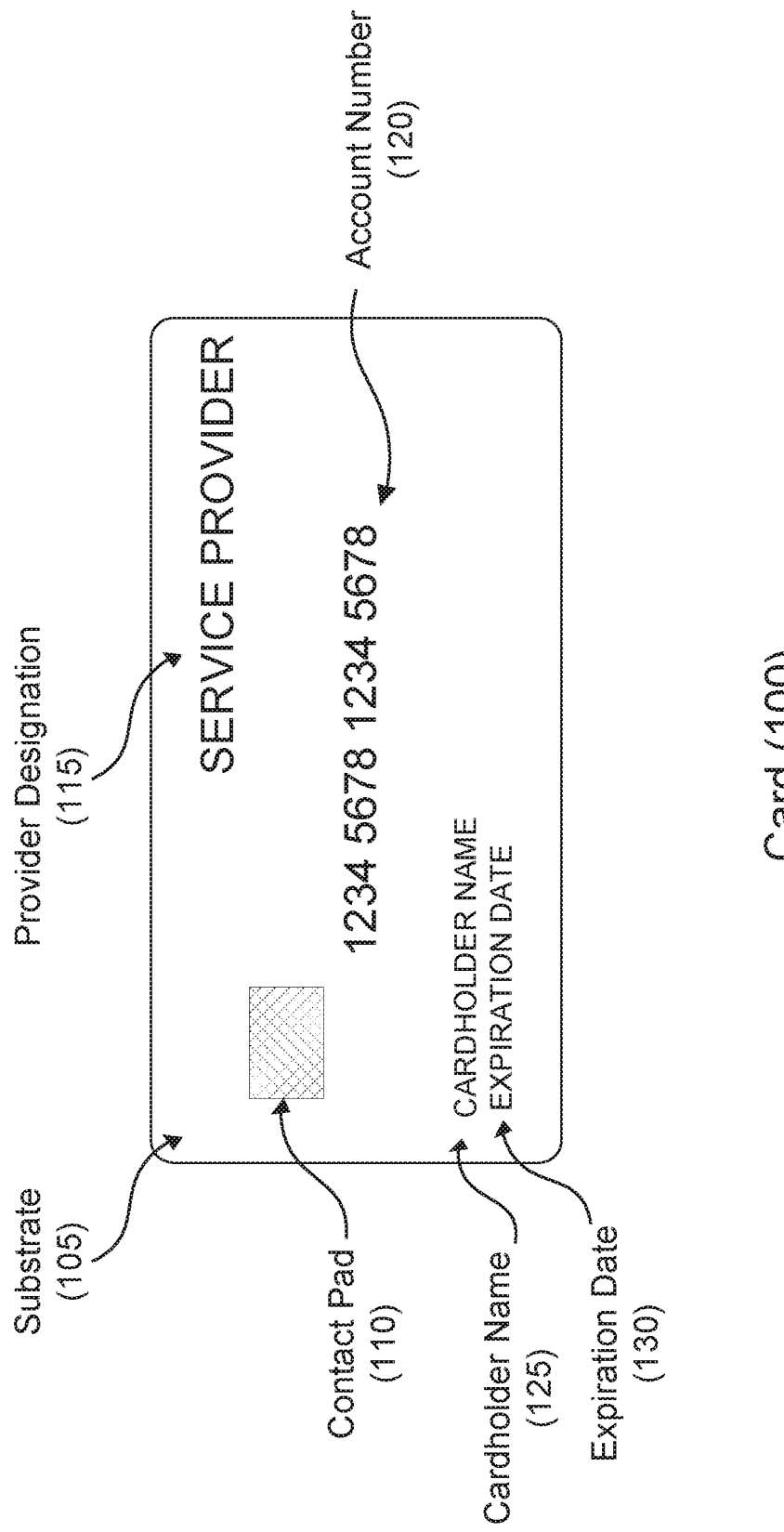

Method (600)

BIODEGRADABLE CARDS AND SYSTEMS AND METHODS FOR MAKING THE SAME

FIELD OF THE INVENTION

The present disclosure relates to biodegradable cards, such as biodegradable payment cards, and to systems and methods for making biodegradable cards.

BACKGROUND

Consumers are increasingly utilizing electronic transactions, such as payment transactions and identity verification transactions. Consumers will commonly carry one or more cards and often carry several cards. Cards that are frequently carried include credit cards, debit cards, and identification cards. Consumers may prefer to use certain cards in certain situations, such as debit or credit cards for payment transactions, for reasons of convenience, to earn rewards based on spending, to better track spending online or through the receipt of monthly statements, or to avoid carrying significant amounts of cash. For these and other reasons, consumers may make many more electronic payment transactions that cash transactions. Consumers may also be required to carry other cards in certain situations, such as a driver's license while driving or an identification card when seeking access to a restricted area. Accordingly, a very large number of cards are in use today, and the demand for cards is increasing.

Conventional cards are often made of materials that are toxic to humans or environmentally unfriendly, such as plastic or metal. Such materials can require expensive production methods, possess questionable durability, and damage the environment. Once produced and manufactured into a card, cards containing these materials can be discarded as trash for various reasons, including damage, loss, or an end to their usefulness. Once discarded, these cards can cause further environmental damage by failing to biodegrade or otherwise cause environmental damage.

These and other deficiencies exist. Accordingly, there is a need for a card that is composed of environmentally friendly materials that can be produced at a reduced cost and that possesses sufficient durability.

SUMMARY

Aspects of the present disclosure include biodegradable cards, such as payment and identification cards, and systems and methods for making biodegradable cards. Various embodiments describe durable, inexpensive cards composed of biodegradable and other environmentally friendly materials.

Embodiments of the present disclosure provide a biodegradable payment card comprising: a biodegradable substrate; a magnetic particle slot within the biodegradable substrate, the magnetic particle slot configured to receive magnetic particles; a high coercivity magnetic stripe comprising magnetic particles printed on the biodegradable substrate, the magnetic stripe encoded with payment account data; and a biodegradable water resistant coating, wherein the coating covers at least the magnetic stripe.

Embodiments of the present disclosure provide a payment card comprising: a biodegradable substrate comprising cellulose, wherein the biodegradable substrate is configured to degrade over time and wherein the biodegradable substrate is substantially free of non-biodegradable materials; a high coercivity magnetic stripe comprising magnetic particles, wherein the magnetic particles are printed onto the biodegradable substrate; and a protective coating derived from a biological material and applied to a surface of the biodegradable substrate, wherein the coating is configured to biodegrade over time.

Further features of the disclosed design, and the advantages offered thereby, are explained in greater detail hereinafter with reference to specific example embodiments illustrated in the accompanying drawings.

BRIEF DESCRIPTION OF THE DRAWINGS

FIG. 1A is an illustration of a card according to an example embodiment.

DETAILED DESCRIPTION OF EXAMPLE EMBODIMENTS

Figure 1B:
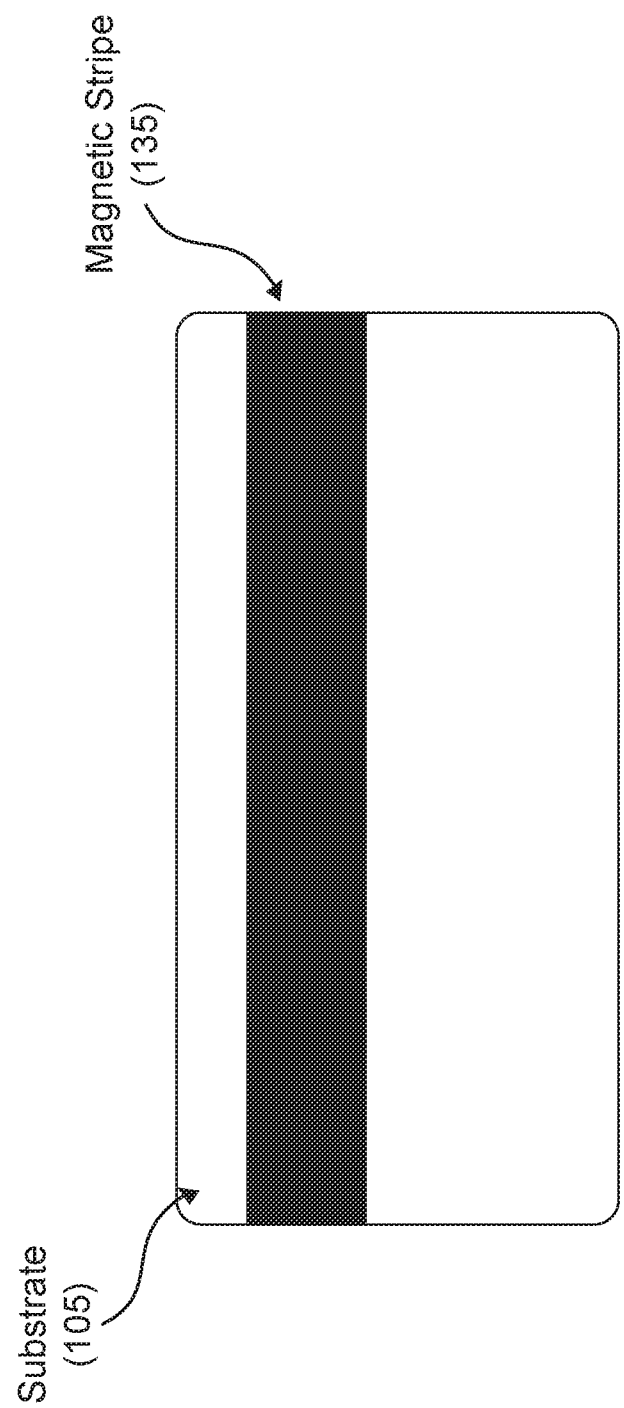
FIG. 1B is an illustration of a card according to an example embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

Example embodiments described herein are directed to biodegradable cards and systems and methods for making biodegradable cards. Biodegradable cards according to example embodiments can be exclusively formed, or substantially formed, of materials that are environmentally friendly and biodegradable over time, as well as non-toxic to humans, animals, and plants. Cards comprising such materials can benefit the environment by being biodegradable or otherwise capable of decomposition over time in a manner that does not harm the environment. For example, cards according to the present disclosure can be free of non-biodegradable components or substantially free of non-biodegradable components. In some examples, cards according to the present disclosure can be compostable. As such, cards according to the present disclosure can be free of non-compostable components or substantially free of non-compostable components.

The use of non-toxic, environmentally friendly materials can reduce manufacturing costs by reducing acquisition costs of synthetic materials. In addition, handling and processing costs can be reduced by using non-toxic, environmentally friendly materials. A further cost reduction can be realized through reduced regulatory requirements in comparison to toxic or otherwise harsh materials.

Cards according to example embodiments can also exhibit increased durability when compared to conventional cards. In some examples, cards according to example embodiments can withstand regular use for more than three years and up to ten or more years.

FIG. 1A illustrates a front view of an example embodiment of card 100, which can comprise a payment card, such as a credit card, debit card, or gift card, or an identification card, such as a driver's license or a club membership card. As shown in FIG. 1A, the card 100 can comprise a substrate 105, a contact pad 110, and a plurality of markings 115, 120, 120, and 130. In some examples, the card 100 may have physical characteristics compliant with the ID-1 format of the ISO/IEC 7810 standard, and the card may otherwise be compliant with the ISO/IEC 14443 standard. However, it is understood that the card 100 according to the present disclosure may have different characteristics, and the present disclosure does not require compliance with a standard.

The substrate 105 can include a single layer or several layers laminated together. The substrate 105 can comprise one or more biodegradable materials, including without limitation one or more biodegradable materials selected from the group of wood, bamboo, bioplastics (e.g., soy bioplastics), cellulose (e.g., compressed cellulose), cork, fiberboard, linoleum, paper, and sand. Substrate 105 can be comprised of a single layer of one biodegradable material, a plurality of layers of multiple biodegradable materials, or a single layer can be formed of a combination of multiple biodegradable materials. In some examples, if the substrate 105 comprises multiple layers, sheets of material can be fed to a laminating press in order to laminate the layers together.

The card 100 can comprise a contact pad 110, which can be embedded in the substrate 105. The contact pad 110 can comprise processing circuitry, an antenna, and other components (not illustrated in FIG. 1A). The card 100 can further comprise a plurality of markings. As shown in FIG. 1A, the markings can include a provider designation 115, an account number 120, a cardholder name 125, and an expiration date 130. It is understood that these markings are exemplary and the present disclosure is not limited to these markings. In some examples, the card 100 can include these markings, other markings, image-based markings (e.g., a photograph and a logo), or no markings. The markings can be applied to the substrate by, e.g., painting using one or more biodegradable paints, inks, or other marking materials, by printing, or by burning, or by a combination thereof.

FIG. 1B illustrates a rear view of the card 100 according to an example embodiment. As shown in FIG. 1B, the substrate 105 can further comprise a magnetic stripe 135. Although not illustrated in FIG. 1B, it is understood that this side of card 100 can include on or more markings, as shown in FIG. 1A.

The magnetic stripe 135 can comprise magnetic particles, including without limitation one or more ferromagnetic materials selected from the group of iron, nickel, steel, and cobalt, along with their respective oxides (e.g., iron oxide). In other examples, particles of diamagnetic materials and paramagnetic materials can be used as the magnetic particle. The magnetic stripe 135 can be applied to the substrate 105 by several methods. For example, the magnetic stripe can be applied to the substrate 105 by particle rolling using a roller. As another example, the magnetic stripe 135 can be applied to the substrate 105 by a printing, method, such as transfer printing. As another example, the magnetic stripe 135 can be applied through the insertion of a tape bearing magnetic particles into the substrate 105.

The magnetic stripe 135 can be encoded with data to facilitate communication with magnetic reading devices, such as magnetic swipe readers and other magnetic card readers.

To promote durability and reliability, the magnetic stripe can demonstrate high coercivity and high retentivity once encoded.

Figure 1C:
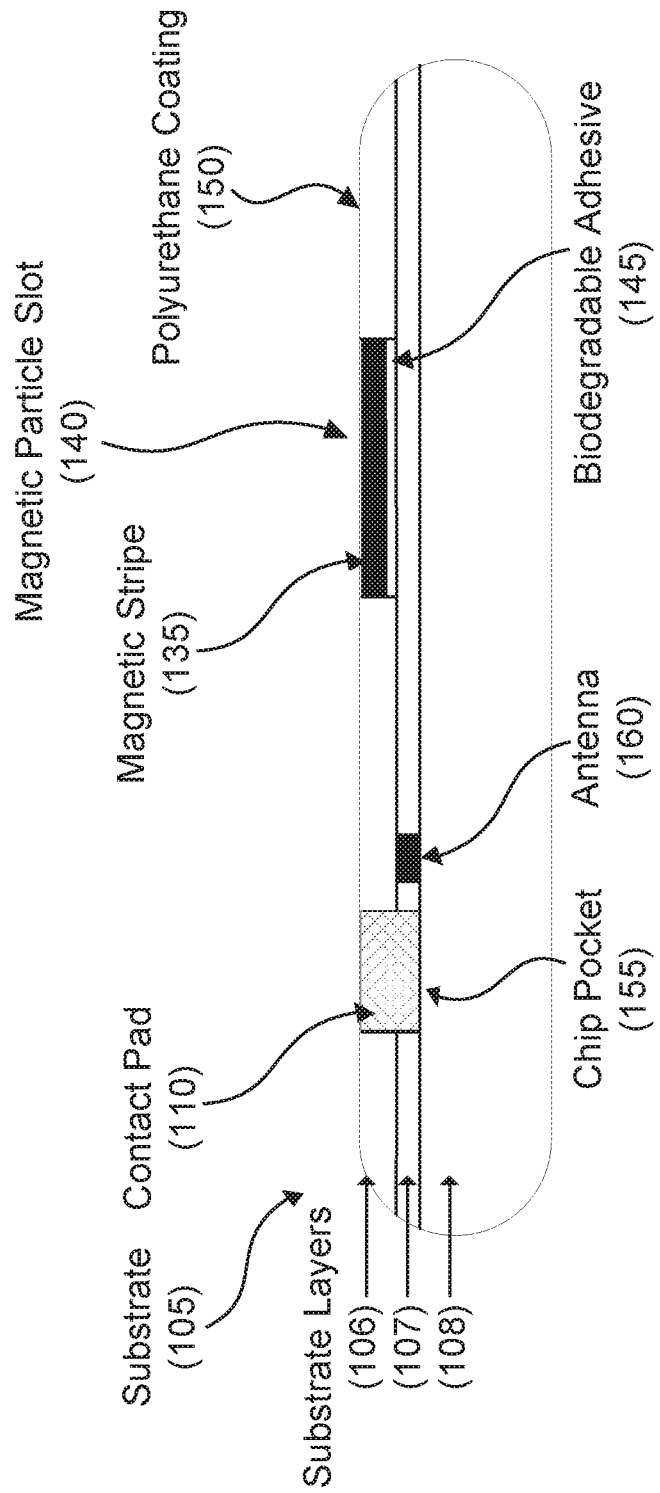
FIG. 1C is an illustration of a card according to an example embodiment.

FIG. 1C illustrates a side view of the card 100 according to an example embodiment. As shown in FIG. 1C, the substrate 105 can be formed of a plurality of substrate layers 106, 107, 108. Each of the plurality of substrate layers can comprise a biodegradable material or a combination of biodegradable materials, and the material used in one of the plurality of layers can be the same or different from the materials used in another of the plurality of layers. For example, substrate layer 106 can be composed of wood, substrate layer 107 can be composed of a bioplastic, and substrate layer 108 can be composed of a combination of compressed cellulose and cork. It is understood that other compositions and combinations of materials can be used.

In some examples, magnetic stripe 135 can be applied within magnetic particle slot 140. As shown in FIG. 1C, magnetic particle slot 140 can be formed within one or more of the plurality of substrate layers (e.g., substrate layer 107) and can be of sufficient height, width and depth to accommodate the volume of magnetic particles necessary to form the magnetic strip 135. In some examples, a biodegradable adhesive layer 145 can be applied within the magnetic particle slot 140 (e.g., upon the upper surface of substrate layer 108) prior to the application of the magnetic particles. For example, the biodegradable adhesive layer 145 can include, without limitation, one or more biodegradable adhesives selected from the group of renewable adhesives (e.g., plant adhesives, beeswax, soybean-based adhesives), biodegradable adhesives (e.g., starch-based biodegradable polymers, polyvinyl alcohol, ethylene vinyl alcohol, polyurethane), and compostable adhesives (e.g. polyester-polyurethane adhesives such as Epotal®). In some examples, the biodegradable adhesive can be a viscous polyurethane, and the viscosity can help hold the magnetic particles in place as the polyurethane solidifies. Further, a polyurethane coating 150 can be applied over the surface of the substrate layer 106 and/or the surface of the magnetic stripe 135. The polyurethane coating 150 can provide protection for the substrate layer 106 and the magnetic stripe 135, including water resistance and abrasion protection. The polyurethane coating 150 can also function to bind the magnetic particles in position. The polyurethane coating 150 can compromise one or more layers of polyurethane and each of the one or more layers can be applied by spraying the substrate layer. The polyurethane coating 150 can cover the magnetic stripe 135 and, in some examples, can cover an additional portion of the substrate 105 or the entirety of the substrate 105. In some examples, the polyurethane coating 150 can have low gloss or no gloss properties.

The substrate 105 can further include a chip pocket 155, and the contact pad 110 can be inserted into the chip pocket 150. The chip pocket 155 can be formed within one or more of the plurality of substrate layers (e.g., substrate layers 106, 107) and can be of sufficient height, width, and depth to accommodate the contact pad 110. The contact pad 110 can be electrically connected to the antenna 160, which can be inserted between one or more of the substrate layers (e.g., substrate layers 107, 108).

The magnetic particle slot 140 and the chip pocket 155 can be formed by, for example, laminating substrate layers specifically shaped to form the desired openings. As another example, the magnetic particle slot 140 and the chip pocket 155 can be formed by milling into one or more of the substrate layers. As a further example, the magnetic particle slot 140 and the chip pocket 155 can be formed by drilling, cutting, or otherwise removing material from the substrate layers.

While FIG. 1C illustrates a substrate comprising a plurality of layers, the present disclosure is not limited thereto. It is understood that, as an alternative to comprising a plurality of layers, the substrate can be a single piece of material.

Figure 2:
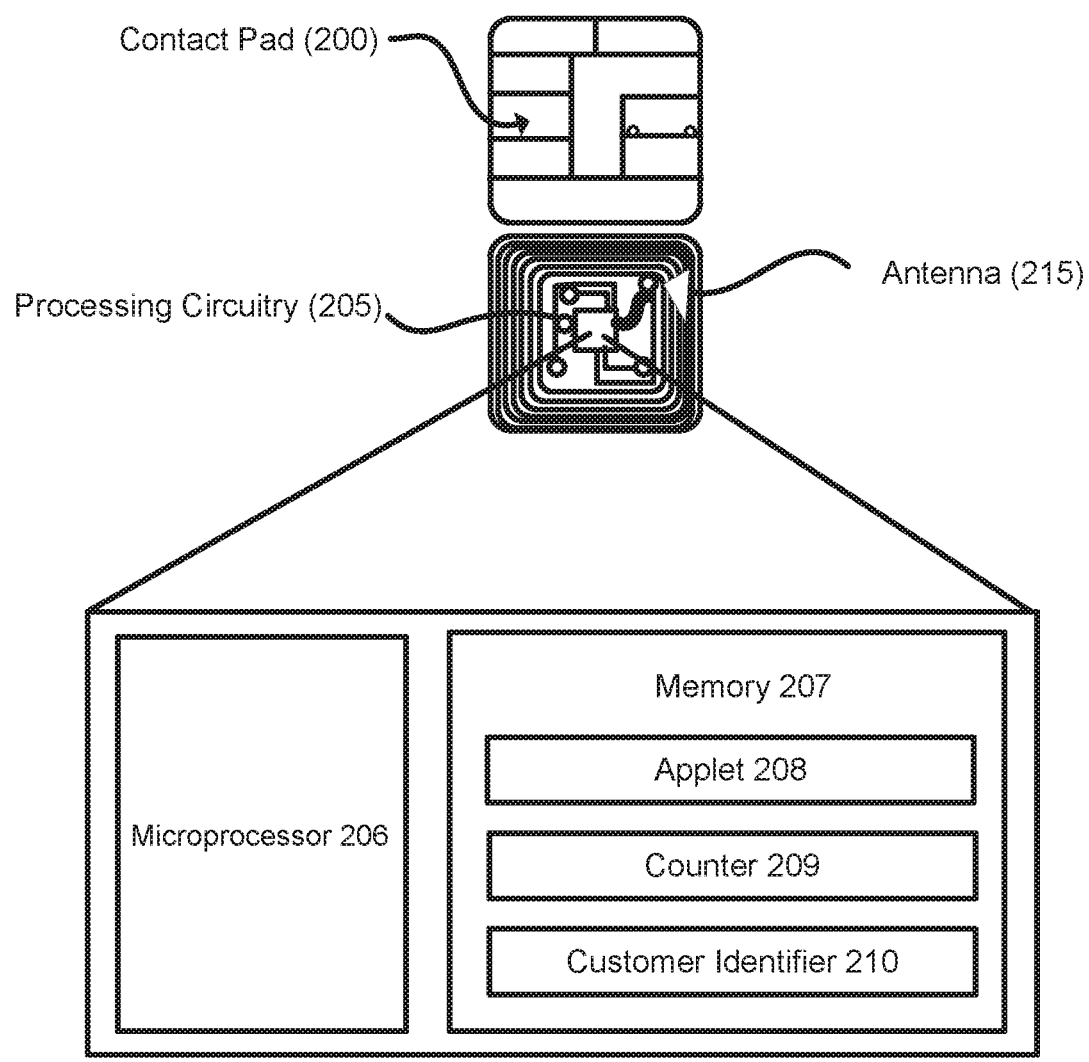
FIG. 2 is an illustration of a contact pad according to an example embodiment.

FIG. 2 illustrates a contact pad 200 according to an example embodiment. The contact pad 200 can be configured to establish contact with another communication device, such as a smart phone, laptop, desktop, tablet computer, or other device, or a kiosk or other information access or transaction device. FIG. 2 may reference the same or similar components of FIGS. 1A-1C, as explained above.

As shown in FIG. 2, the contact pad 200 comprises processing circuitry 206 and antenna 215 located behind the contact pad 200. In other examples, such as the example embodiment illustrated in FIG. 1C, the antenna can be electrically connected to, but separate from, the contact pad. In addition, the processing circuitry 206 can be located elsewhere within the card other than behind the contact pad 200.

The processing circuitry 205 can store and process information, and can further compromise a microprocessor 206 and a memory 207. It is understood that the processing circuitry 205 may contain additional components, including processors, memories, error and parity/CRC checkers, data encoders, anticollision algorithms, controllers, command decoders, security primitives and tamperproofing hardware, as necessary to perform the functions described herein.

The memory 207 may be a read-only memory, write-once read-multiple memory or read/write memory, e.g., RAM, ROM, and EEPROM, and the card may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 207 may be configured to store one or more applets 208, one or more counters 209, and a customer identifier 210. The one or more applets 208 may comprise one or more software applications configured to execute on one or more cards, such as Java Card applet. However, it is understood that applets 208 are not limited to Java Card applets, and instead may be any software application operable on cards or other devices having limited memory. The one or more counters 209 may comprise a numeric counter sufficient to store an integer. The customer identifier 210 may comprise a unique alphanumeric identifier assigned to a user of the card, and the identifier may distinguish the user of the card from other card users. In some examples, the customer identifier 210 may identify both a customer and an account assigned to that customer and may further identify the card associated with the customer's account.

The processor and memory elements of the foregoing example embodiments are described with reference to the contact pad 200, but the present disclosure is not limited thereto. It is understood that these elements may be implemented outside of the contact pad 200 or entirely separate from it, or as further elements in addition to microprocessor 206 and memory 207 elements located within the contact pad 200.

In some examples, the card may comprise one or more antennas 215. The one or more antennas 215 may be placed within the card and around the processing circuitry 205 of the contact pad 200. For example, the one or more antennas 215 may be integral with the processing circuitry 205 and the one or more antennas 215 may be used with an external booster coil. As another example, the one or more antennas 215 may be external to the contact pad 200 and the processing circuitry 205.

In some examples, the contact pad 200 can comprise components formed of biodegradable materials. For example, components of the contact pad can be made of wood or wood-derived materials, such as nanocellulose paper. The use of such materials can reduce the reliance upon rare earth elements and other electronics materials with materials that are biodegradable, as well as less toxics and less resource-intensive in their acquisition.

Figure 3:
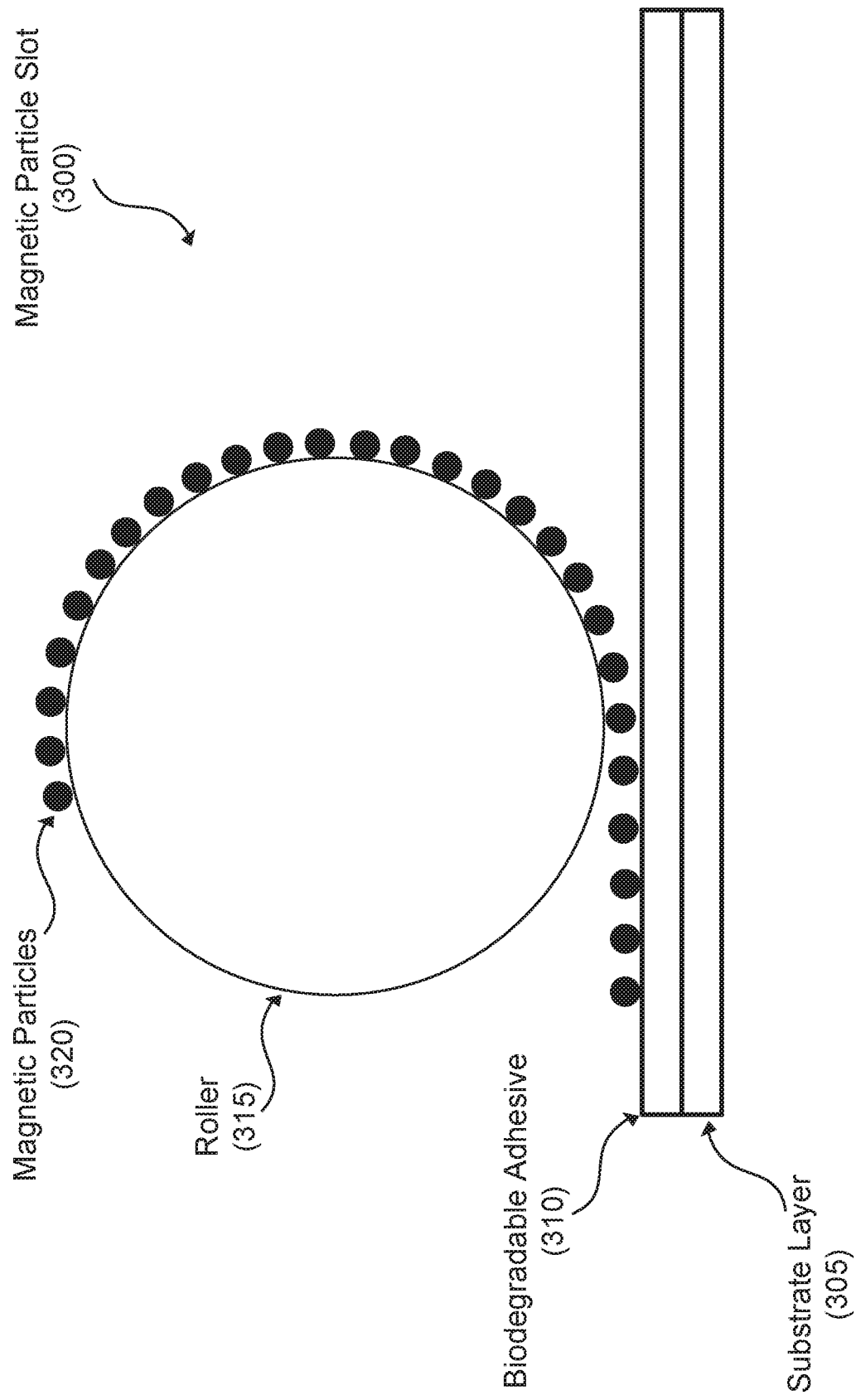
FIG. 3 is an illustration of a roller according to an example embodiment.

FIG. 3 illustrates a roller for applying magnetic particles according to an example embodiment. FIG. 3 may reference the same or similar components of FIGS. 1-2, as explained above.

FIG. 3 shows the magnetic particle slot 300 comprising a substrate layer 305 and a biodegradable adhesive 310 applied thereto. It is understood that the substrate layer 305 can be part of a unitary substrate or one of a plurality of substrate layers that together comprise the substrate. A roller 315 can be utilized to apply the magnetic particles 320 to the biodegradable adhesive 310. In some examples, the roller 315 can apply the magnetic particles 320 prior to the solidification of the biodegradable adhesive 310, in order to promote accurate particle placement and binding of the particles to the adhesive.

It is understood that the present disclosure is not limited to the use of a roller for the application of magnetic particles, and other methods can be utilized. For example, the magnetic particles can be applied by a printing method (e.g., transfer printing), a spraying method, or via the insertion of a tape bearing magnetic particles within the substrate.

The magnetic particles 320 can comprise one or more types of magnetic particles. For example, the magnetic particles 320 can comprise iron oxide particles. As another example, the magnetic particles 320 can comprise, without limitation one or more ferromagnetic materials selected from the group of iron, nickel, steel, and cobalt, along with their respective oxides.

Figure 4:
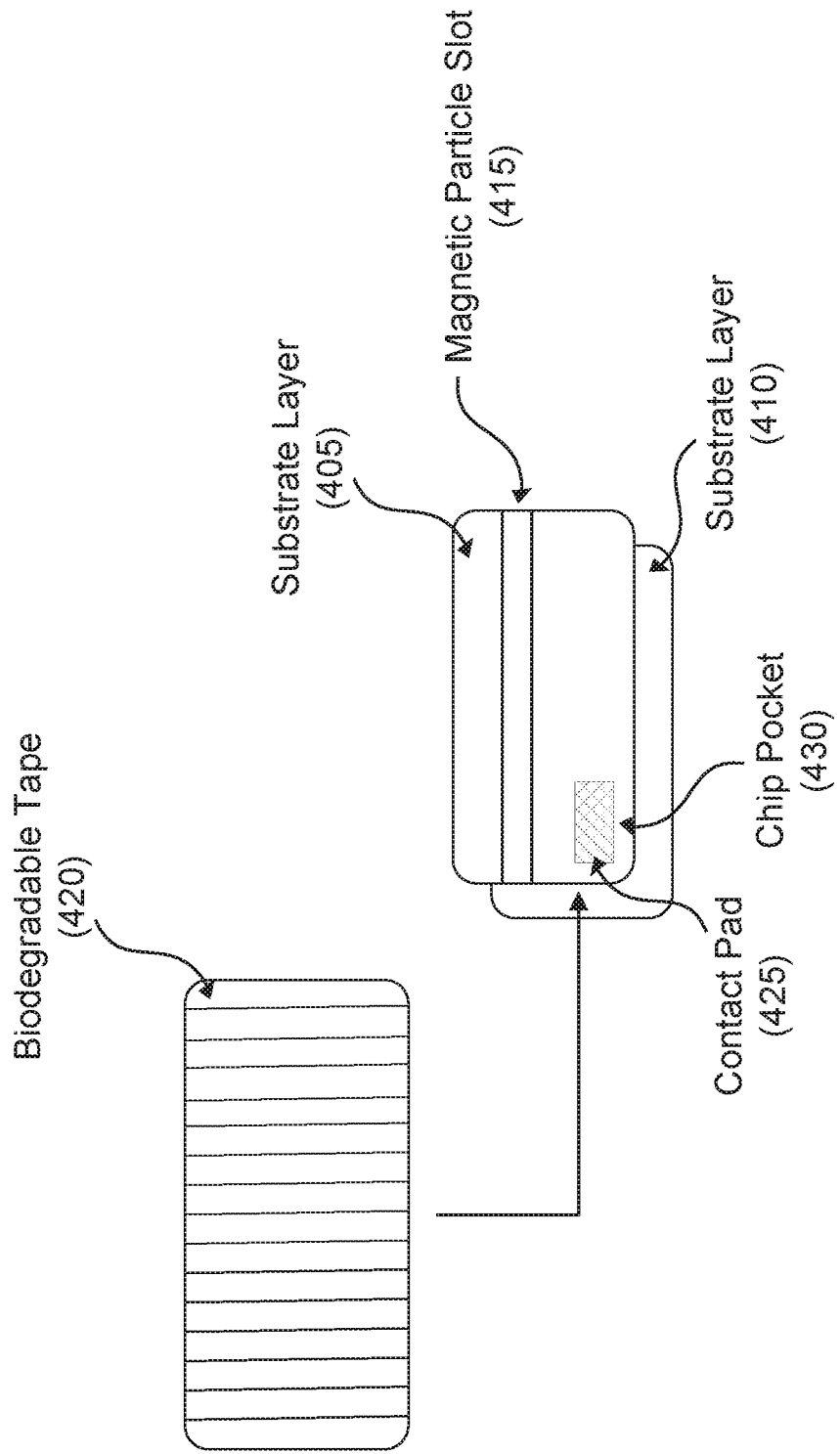
FIG. 4 is an illustration of a tape according to an example embodiment.

FIG. 4 illustrates a tape for inserting magnetic particles into a substrate according to an example embodiment. FIG. 4 may reference the same or similar components of FIGS. 1-3, as explained above.

FIG. 4 shows a substrate comprised of substrate layer 405 and substrate layer 410, and these layers can be comprised of one or more biodegradable materials described herein. A magnetic particle slot 415 can be formed in substrate layer 405 and substrate layer 405.

As shown in FIG. 4, a biodegradable tape 420 can be inserted between the substrate layer 405 and the substrate layer 410. The tape insertion can take place prior to the lamination of the lamination of the substrate layers. As another example, if the substrate layers 405, 410 are configured to leave sufficient space for insertion, the biodegradable tape 420 can be inserted after the lamination of the substrate layers 405, 410. As a further example, if the substrate is a unitary substrate comprising a single piece of material, the biodegradable tape 420 can be inserted within the substrate if sufficient space for insertion is created within the substrate through the removal of material.

The biodegradable tape 420 can comprise one or more biodegradable materials. For example, the biodegradable tape 420 can be comprised of, without limitation, paper tape, cellophane tape, cellulose tape, or a combination thereof. The biodegradable tape 420 can further include a biodegradable adhesive on one or both sides, in order to adhere the biodegradable tape 420 to the substrate. In addition, magnetic particles can be applied to one side of the biodegradable tape 420 having the adhesive, such as the side facing towards the magnetic particle slot 415, and the adhesive can function to hold the magnetic particles in place following application. The application of the magnetic particles to the biodegradable tape 420 can be by one or more of the application described herein, or by other application methods. Once the biodegradable tape 420 bearing adhesive and the magnetic particles is inserted into the substrate, the magnetic particle slot 415 can expose the magnetic particles to create a magnetic stripe.

In some examples, as shown in FIG. 4 a contact pad 425 can be inserted within a chip pocket 430 formed in the substrate layers 405, 410. The chip pocket 430 can be formed within the substrate so that the contact 425 can be in contact with, and adhered to, the biodegradable tape 420.

Figure 5:
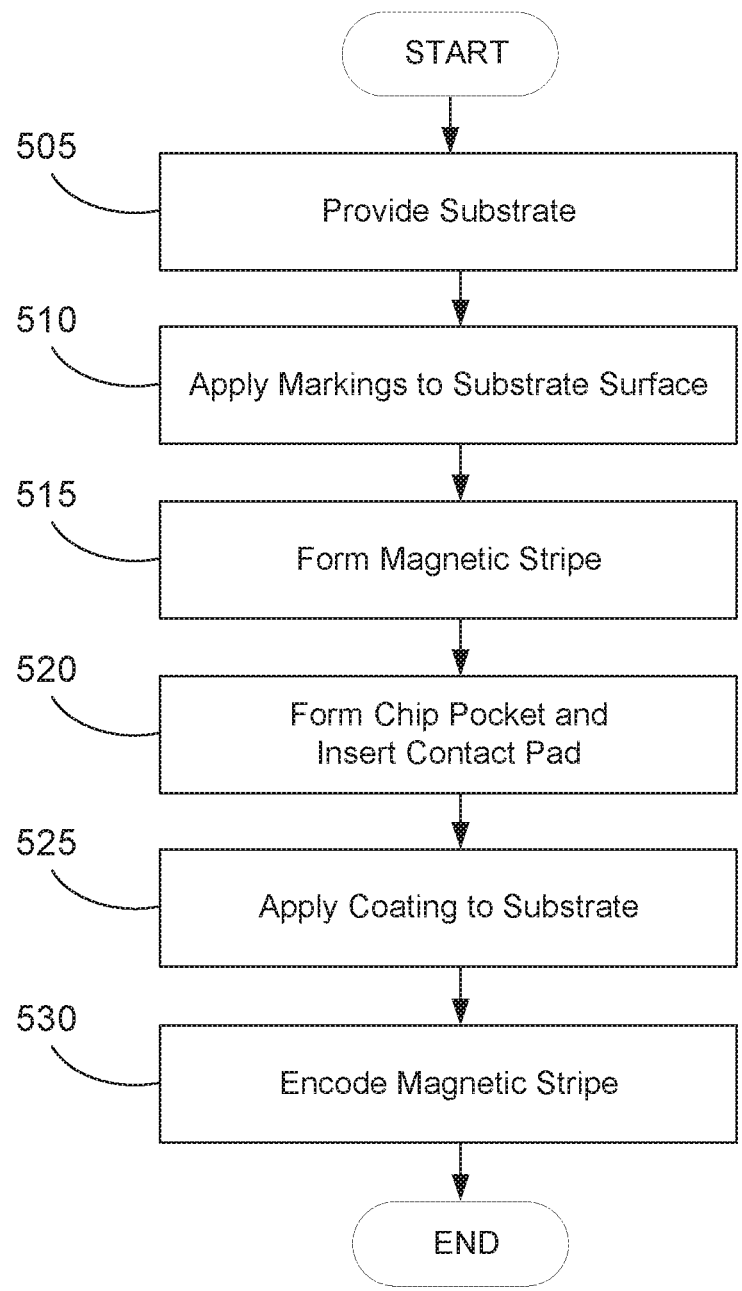
FIG. 5 illustrates a method of making a card according to an example embodiment.

FIG. 5 illustrates a method of making a biodegradable card according to an example embodiment. FIG. 5 may reference the same or similar components of FIGS. 1-4, as explained above.

The method 500 can commence in step 505 where a substrate can be provided. The substrate can comprise a single piece or a plurality of layers. If the substrate comprises a plurality of layers, the layers may be laminated together (e.g., using a laminating press) or otherwise affixed together in order to function as a unitary substrate. The substrate can be formed one or more biodegradable materials, including or more of wood, bamboo, bioplastics, cellulose, cork, fiberboard, linoleum, paper, and sand.

The substrate can further comprise one or more markings, such as a provider designator, an account number, a cardholder name, an expiration date, one or more photographs, one or more logos. At step 510, the markings can be applied to the substrate by, e.g., painting using one or more biodegradable paints, inks, or other marking materials. In some examples, the markings can be formed by printing and/or burning in addition to, or instead of, painting.

In step 515, a magnetic stripe can be formed. The magnetic stripe can comprise magnetic particles, such as including without limitation one or more ferromagnetic materials selected from the group of iron, nickel, steel, and cobalt, along with their respective oxides, such as iron oxide. Diamagnetic materials and paramagnetic materials can be also be used as the magnetic particles. The magnetic particles can be applied using a roller, by one or more printing methods, such as transfer printing, or by the insertion of a tape bearing magnetic particles into the substrate.

At step 520, a chip pocket can be formed in the substrate and a contact pad can be inserted. The chop pocket can be formed by milling, drilling, and/or cutting the substrate, or by laminating substrate layers specifically shaped to accommodate the chip pocket.

In step 525, a coating can be applied to the substrate by, e.g., spraying. The coating can composed of one or more biodegradable degradable materials, such as polyurethane. The coating can provide protective features, such as water resistance and protections against abrasions, as well as function to hold the magnetic particles in place. The coating can cover the magnetic stripe and, in some examples, can cover an additional portion of the substrate or the entirety of the substrate. The coating can comprise one layer or a plurality of layers. In some examples, the coating can exhibit low gloss or no gloss properties.

In step 530, the magnetic stripe can be encoded with data. The data encoded can include, without limitation, account data, account access data, security data, identification data, membership data, payment data, or other data. Once encoded with data, the magnetic stripe can communicate with magnetic stripe readers, such as magnetic swipe readers and other magnetic reading devices. Once encoded, the magnetic stripe can demonstrate high coercivity and high retentivity.

Figure 6:
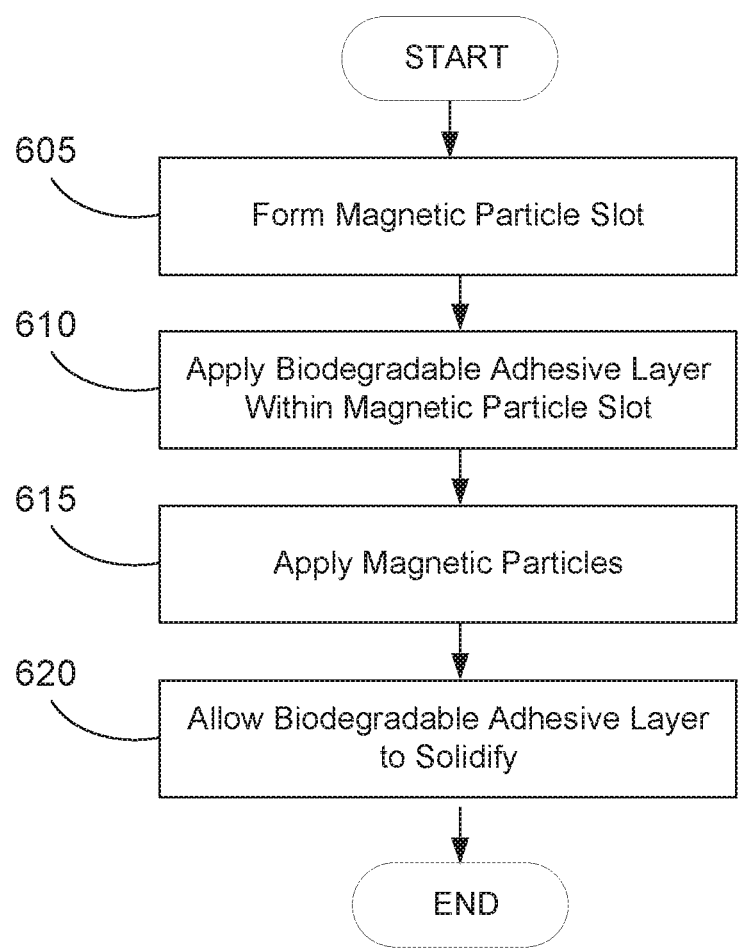
FIG. 6 illustrates a method of making a magnetic stripe according to an example embodiment.

FIG. 6 illustrates a method of making a magnetic stripe according to an example embodiment. FIG. 6 may reference the same or similar components of FIGS. 1-5, as explained above.

Method 600 can commence at step 605, with the forming of a magnetic particle slot. The magnetic particle slot can be of sufficient dimensions to accommodate the magnetic particles and other materials necessary to form the magnetic stripe. The magnetic particle slot can be formed by several methods, including laminating substrate layers shaped for the magnetic particle slot, milling the substrate, drilling, cutting, and otherwise removing material from the substrate layers, or a combination thereof. Once the magnetic particle slot is formed, the method can proceed to step 610.

In step 610, a biodegradable adhesive layer can be applied within the magnetic particle slot. The adhesive layer can include, without limitation, renewable adhesives (e.g., plant adhesives, beeswax, soybean-based adhesives), biodegradable adhesives (e.g., starch-based biodegradable polymers, polyvinyl alcohol, ethylene vinyl alcohol, polyurethane), and/or compostable adhesives (e.g. polyester-polyurethane adhesives such as Epotal®). Once applied to the substrate, the adhesive can take a period of time to solidify.

In step 615, prior to the solidification of the adhesive layer, magnetic particles can be applied within the magnetic particle slot. In some examples, a roller can be utilized to apply the magnetic particles to the adhesive. In some examples, the roller can apply the magnetic particles prior to the solidification of the adhesive, in order to promote accurate particle placement and binding of the particles to the adhesive. In other examples, the magnetic particles can be applied by a printing method (e.g., transfer printing) or a spraying method. In a further example, a tape bearing magnetic particles can be inserted within the substrate, in alignment with the magnetic particle slot, so as to expose the magnetic particles and allow for the magnetic stripe to be formed. Once the magnetic particles have been applied, the method 600 can proceed to step 620, where the adhesive can be allowed to solidify over a period of time.

As used herein, the term "card' is not limited to a particular type of card. Rather, it is understood that the term "card" can refer to a contact-based card, a contactless card, or any other card including a chip, unless otherwise indicated. It is further understood that the present disclosure is not limited to cards having a certain purpose (e.g., payment cards, gift cards, identification cards, of membership cards), to cards associated with a particular type of account (e.g., a credit account, a debit account, a membership account), or to cards issued by a particular entity (e.g., a financial institution, a government entity, or a social club). Instead, it is understood that the present disclosure includes cards having any purpose, account association, or issuing entity.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A biodegradable payment card, comprising:
a biodegradable substrate comprising a first substrate layer, a second substrate layer, and a biodegradable tape layer, wherein:
the biodegradable tape layer is positioned between the first substrate layer and the second substrate layer,
a first surface of the biodegradable tape layer bears magnetic particles forming a high coercivity magnetic stripe, the magnetic stripe encoded with payment account data, and
the first substrate layer and the second substrate layer form a unitary structure comprising a single piece of material;
a magnetic particle slot within the biodegradable substrate, wherein the magnetic particle slot is aligned with the magnetic particles on the first surface of the biodegradable tape layer;
a chip pocket within the biodegradable substrate;
a chip having a contact pad, wherein the contact pad of the chip is inserted into the chip pocket and the contact pad is adhered to the biodegradable tape layer; and
a biodegradable water resistant coating, wherein the coating covers at least the magnetic stripe.

2. The biodegradable card of claim 1, wherein the card is substantially free of non-biodegradable components.

3. The biodegradable card of claim 1, wherein the magnetic particles are transfer printed onto the biodegradable substrate.

4. The biodegradable card of claim 1, wherein the biodegradable substrate consists essentially of compressed cellulose.

5. The biodegradable card of claim 1, wherein the biodegradable substrate consists essentially of wood.

6. The biodegradable card of claim 1, wherein the magnetic stripe is formed by printing the magnetic particles onto a biodegradable adhesive layer applied to the biodegradable substrate.

7. The biodegradable card of claim 1, wherein the magnetic particles comprise iron oxide.

8. The biodegradable card of claim 1, further comprising an antenna electrically connected to the chip and inserted between the two or more laminate layers.

9. A payment card, comprising:
a biodegradable substrate, wherein:
the biodegradable substrate comprises a first substrate layer, a second substrate layer, a biodegradable tape layer, and a chip pocket,
the first substrate layer and the second substrate layer form a unitary structure comprising a single piece of material,
the biodegradable tape layer is positioned between the first substrate layer and the second substrate layer,
a first surface of the biodegradable tape layer bears magnetic particles forming a high coercivity magnetic stripe, the magnetic stripe encoded with payment account data,
the chip pocket contains a contact pad of a chip adhered to the biodegradable tape layer,
the biodegradable substrate is configured to biodegrade over time, and
the biodegradable substrate is substantially free of non-biodegradable materials; and
a protective coating derived from a biological material and applied to a surface of the biodegradable substrate, wherein the coating is configured to biodegrade over time.

10. The payment card of claim 9, wherein:
the biodegradable tape layer further comprises a second surface, and
the first surface of the biodegradable tape layer and the second surface of the biodegradable tape layer include a biodegradable adhesive.

11. The payment card of claim 10, wherein the biodegradable adhesive including on the first surface of the biodegradable tape layer holds the magnetic particles in position to form the magnetic stripe.

12. A method of manufacturing a biodegradable card, comprising:
providing a first substrate layer, a second substrate layer, and a biodegradable tape layer, wherein:
a first surface of the biodegradable tape layer bears magnetic particles forming a high coercivity magnetic stripe,
the magnetic stripe is encoded with payment account data, and
the first substrate layer and the second substrate layer form a unitary structure comprising a single piece of material;
positioning the biodegradable tape layer between the first substrate layer and the second substrate layer;
forming a magnetic particle slot within the first substrate layer;
laminating the first substrate layer, the second substrate layer, and the biodegradable tape layer;
forming a chip pocket within the first substrate layer and the second substrate layer;
inserting a chip having a contact pad into the chip pocket;
adhering the contact pad of the chip to the biodegradable tape layer; and
applying a biodegradable water resistant coating to cover at least the magnetic stripe.

13. The method of claim 12, further comprising aligning the magnetic particle slot of the first substrate layer with the magnetic particles on the first surface of the biodegradable tape layer.

14. The method of claim 13, wherein
positioning the biodegradable tape layer between the first substrate layer and the second substrate layer comprises inserting the biodegradable tape layer between the first substrate layer and the second substrate layer in the unitary structure.

15. The method of claim 12, wherein, prior to inserting the biodegradable tape layer between the first substrate layer and the second substrate layer in the unitary structure, the method comprises removing material from the unitary structure.

16. The method of claim 13, further comprising painting a marking on the second layer of the substrate using a biodegradable paint.

17. The method of claim 16, wherein the marking comprises a photograph.

18. The biodegradable card of claim 1, wherein the magnetic particles comprise at least one selected from the group of diamagnetic materials and paramagnetic materials.

19. The method of claim 12, wherein the chip pocket is formed by milling the first substrate layer and the second substrate layer.

20. The method of claim 12, wherein:
the first substrate layer and the second substrate layer are shaped to form an opening for the chip pocket, and
the chip pocket is formed when the first substrate layer, the second substrate layer, and the biodegradable tape layer are laminated.

* * * * *